(12) United States Patent
Thebault et al.

(10) Patent No.: US 10,742,849 B2
(45) Date of Patent: Aug. 11, 2020

(54) DETERMINATION OF CHROMA MAPPING FUNCTIONS BASED ON HUE ANGULAR SECTORS PARTITIONING THE GAMUT MAPPING COLOR SPACE

(71) Applicant: INTERDIGITAL CE PATENT HOLDINGS, Paris (FR)

(72) Inventors: Cedric Thebault, Chantepie (FR); Jurgen Stauder, Montreuil/Ille (FR); Anita Orhand, Cesson-Sévigné (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/337,885

(22) PCT Filed: Sep. 21, 2017

(86) PCT No.: PCT/EP2017/073851
§ 371 (c)(1),
(2) Date: Mar. 28, 2019

(87) PCT Pub. No.: WO2018/060037
PCT Pub. Date: Apr. 5, 2018

(65) Prior Publication Data
US 2020/0028991 A1     Jan. 23, 2020

(30) Foreign Application Priority Data

Sep. 28, 2016   (EP) .................................... 16306247

(51) Int. Cl.
*H04N 1/60*     (2006.01)
*H04N 9/04*     (2006.01)

(52) U.S. Cl.
CPC ....... *H04N 1/6058* (2013.01); *H04N 9/04513* (2018.08)

(58) Field of Classification Search
CPC .......... H04N 1/56; H04N 1/60; H04N 1/6058; H04N 1/6061; H04N 1/6063; H04N 1/6066; H04N 1/6069; G09G 2340/06
See application file for complete search history.

(56) References Cited

U.S. PATENT DOCUMENTS

| | | | | | |
|---|---|---|---|---|---|
| 5,933,253 | A | * | 8/1999 | Ito ........................ | H04N 1/6058 358/500 |
| 6,437,792 | B1 | * | 8/2002 | Ito ........................ | H04N 1/6058 345/590 |

(Continued)

FOREIGN PATENT DOCUMENTS

| EP | 2375719 | 10/2011 |
|---|---|---|
| WO | WO2008062355 | 5/2008 |

OTHER PUBLICATIONS

Anonymous, "Approximation Theory", Wikipedia, http://en.wikipedia.org/wiki/Approximation_theory/, May 27, 2017, 6 pages.

(Continued)

*Primary Examiner* — Scott A Rogers
(74) *Attorney, Agent, or Firm* — Invention Mine LLC

(57) ABSTRACT

This determination comprises: defining key constant-hue leaves such as to partition the gamut mapping color space into angular hue sectors; for each key constant hue leaf, defining a key hue leaf chroma mapping function; for each angular hue sector, defining a continuous angular hue sector chroma mapping function such that, for any source color belonging to one of the two key constant-hue leaves delimiting this angular hue sector, this continuous chroma mapping function allows to map the chroma of said source color according to the key hue leaf chroma mapping function of the key constant-hue leaf to which said source color belongs. Preferably, this mapping functions are non linear polynomials.

17 Claims, 4 Drawing Sheets

(56) References Cited

U.S. PATENT DOCUMENTS

| | | | | |
|---|---|---|---|---|
| 6,618,499 | B1* | 9/2003 | Kohler | H04N 1/6058 358/518 |
| 7,573,610 | B2* | 8/2009 | Um | H04N 1/6058 345/603 |
| 7,893,945 | B2* | 2/2011 | Ramanath | G06T 11/001 345/589 |
| 8,432,588 | B2* | 4/2013 | Morovic | H04N 1/6058 345/590 |
| 8,593,682 | B2* | 11/2013 | Tomita | H04N 1/6075 358/1.9 |
| 10,270,943 | B2* | 4/2019 | Thebault | H04N 1/6058 |
| 10,284,750 | B2* | 5/2019 | Morvan | H04N 1/6058 |
| 2005/0248784 | A1 | 11/2005 | Henley et al. | |
| 2005/0280848 | A1 | 12/2005 | Seko | |
| 2007/0195382 | A1* | 8/2007 | Cho | H04N 1/6058 358/518 |
| 2010/0302404 | A1 | 12/2010 | Mizukura et al. | |
| 2016/0379595 | A1* | 12/2016 | Stauder | H04N 9/67 345/590 |
| 2016/0381254 | A1* | 12/2016 | Poree | H04N 9/67 382/167 |
| 2018/0191925 | A1* | 7/2018 | Stauder | H04N 1/6058 |
| 2018/0352263 | A1* | 12/2018 | Francois | H04N 1/6019 |

OTHER PUBLICATIONS

Montag et al., "Psychophysical Evaluation of Gamut Mapping Techniques Using Simple Rendered Images and Artificial Gamut Boundaries",—IEEE Transactions on Image Processing, vol. 6, No. 7, Jul. 1997, pp. 977-989.

Morovic et al., "The Fundamentals of Gamut Mapping: A Survey", Journal of Imaging Science and Technology, vol. 45, No. 3, May/Jun. 2001, pp. 283-290.

Anonymous, "Polynomial Regression", Wkipedia, https://en.wikipedia.org/wiki/Polynomial_regression/, Aug. 30, 2017, 5 pages.

Anonymous, "Gibbs Phenomenon", Wkipedia, https://en.wikipedia.org/wiki/Gibbs_phenomenon/, Aug. 29, 2017, 9 pages.

Anonymous, "Parameter values for the HDTV standards for production and international programme exchange", International Telecommunication Union, ITU-R Radiocommunication Sector of ITU, Recommendation ITU-R BT.709-6, Jun. 2015, pp. 1-19.

Zolliker et al., "On the Continuity of Gamut Mapping Algorithms", SPIE Electronic Imaging Conference 2005, San Jose, California, USA, Jan. 16, 2995, pp. 220-234.

Anonymous, "Curve Fitting", Wikipedia, https://en.wikipedia.org/wiki/Curve_fitting/, Aug. 23, 2017, 8 pages.

* cited by examiner

DETERMINATION OF CHROMA MAPPING FUNCTIONS BASED ON HUE ANGULAR SECTORS PARTITIONING THE GAMUT MAPPING COLOR SPACE

This application claims the benefit, under 35 U.S.C. § 365 of International Application PCT/EP2017/073851, filed Sep. 21, 2017, which was published in accordance with PCT Article 21(2) on Apr. 5, 2018, in English, and which claims the benefit of European Patent Application No. 16306247.4, filed Sep. 28, 2016.

TECHNICAL FIELD

The invention concerns a method for mapping source colors from a source gamut to a target gamut using a chroma mapping interpolation over different angular hue sectors partitioning the mapping color space.

BACKGROUND ART

Morovic and Luo give a comprehensive overview on gamut mapping algorithms. Montag and Fairchild as well as Zolliker present comprehensive comparisons and evaluate different approaches. See notably the following references:
J. Morovic and M. R. Luo, "The Fundamentals of Gamut Mapping: A Survey", Journal of Imaging Science and Technology, 45/3:283-290, 2001.
Montag E. D., Fairchild M. D, "Psychophysical Evaluation of Gamut Mapping Techniques Using Simple Rendered Images and Artificial Gamut Boundaries", IEEE Trans. Image Processing, 6:977-989, 1997.
P. Zolliker, M. Dätwyler, K. Simon, On the Continuity of Gamut Mapping Algorithms, Color Imaging X: Processing, Hardcopy, and Applications. Edited by Eschbach, Reiner; Marcu, Gabriel G. Proceedings of the SPIE, Volume 5667, pp. 220-233, 2004.

An application area of color gamut mapping is notably video content production and post-production. For example, an original version of a video content needs to be converted into specific versions adapted for different types of reproduction or transmission: for example, a specific version for cinema, another for television, and a third one for internet. These different versions can be prepared by manual color correction or/and by application of gamut and tone mapping algorithms.

Among the requirements for color gamut mapping are notably:
preservation of color neighborhood and order, absence of color banding and false contours, in order, notably, to prevent from incoherent reproduction of grey and color ramps;
continuity of color and absence of visible quantization or clipping errors, in order, notably, to prevent from banding and false contours;
separate control for lightness, hue and saturation for keeping the full artistic control on how colors are modified, and for allowing the formulation of a higher, semantic level of artistic intents.

In order to define a color gamut mapping, a gamut boundary description (GBD) of the source color gamut and of the target color gamut is generally used. Such a GBD of a color gamut defines the boundary surface of this color gamut in a color space. GBDs comprise generally explicit, generic 3D representations such as triangle meshes or volume models. For instance, a GBD of a color gamut can be based on a mesh of triangles, each triangle being defined by its three vertices in the color space of this GBD. These vertices are colors located on the boundary of the color gamut.

FIG. 1 illustrates a source color gamut in a RGB color space of a color device. Such a color device can be for instance a display device or an image capture device, or a virtual device corresponding for instance to a standard, as BT.709. This source color gamut forms a cube having vertices formed by a black and white point, by three primary colors, respectively red, green and blue, and by three secondary colors, respectively yellow, cyan and magenta. Rim colors are colors located on a line linking the black or white point with any of the primary colors. Rim colors form rims shown as solid lines. Cusp colors are colors located on a line linking any of the primary colors with any of the secondary colors comprising this primary color. Cusp colors form cusp shown as dotted lines. A target color gamut can be represented similarly as a cube in a RGB color space.

FIG. 2 illustrates the same source color gamut and target color gamut in a CIE Lab color space. When represented in polar coordinates (i.e. with a chroma C and a hue h instead of a and b), this color space allows to define 2D constant-hue leaves having axes for lightness and chroma. Rim lines and cusp lines of the source and target gamuts are shown on this figure.

Still in the Lab color space, FIG. 3 illustrates, in a plane of constant lightness, i.e. in a hue/chroma plane, the projection of the cusp line (solid line) joining the three primary colors Rs, Gs, Bs through the three secondary colors Ys, Cs, Ms of the source color gamut of FIG. 2, together with a projection of the cusp line (dotted line) joining the three primary colors $R_T$, $G_T$, $B_T$ through the three secondary colors $Y_T$, $C_T$, $M_T$ of the target color gamut of FIG. 2. The point at the center of this figure corresponds to the black point and to the white point of FIG. 1.

FIG. 4 shows an exemplary plot diagram illustrating chroma mapping gain in function of hue angle resulting from a color gamut mapping (FIG. 4 will further illustrate an embodiment of the invention—see below). As used herein, the chroma mapping gain may be defined for each hue as the ratio between the chroma of a cusp color at the boundary of the target color gamut and the chroma of a cusp color having the same hue at the boundary of the source color gamut.

The vertical axis of the plot diagram pertains to a chroma mapping gain. The horizontal axis of the plot diagram pertains to hue measured in degrees. The plot diagram includes a plot line that demonstrates the chroma mapping gain versus hue. Plot line relates to mapping the source color gamut to the target color gamut (using a cusp mapping).

In the situation illustrated on this FIG. 4, the chroma mapping gain ($\gamma$) is representative of a simple linear chroma mapping which, for each hue, linearly maps the chroma of any source color so that the chroma of the source cusp color having the same hue as said source color is mapped to the chroma of the target cusp color having the same hue in the target color gamut: $C'=\gamma \cdot C$. This is a linear function.

Despite the simple definition of this chroma mapping, interpolating this linear function (i.e. interpolating the single coefficient) over a range of hues including a source or a target primary color requires the use of a polynomial function (with hue as variable) with high degree. But even with high degree polynomial functions, interpolation errors are still huge.

These errors are even more critical because they occur for the primary colors which are the most saturated colors. These errors will either lead to clipping or to desaturated colors.

These slope discontinuity points also increase the oscillations of the mapping function (similarly to the so-called Gibbs phenomenon). These oscillations of the mapping function can generate undesirable oscillations in smooth areas of the mapped picture.

This problem illustrated on a simple linear chroma mapping is even more severe when applied to a more complex chroma mapping (i.e. polynomial function of higher degree of the variable chroma) since the errors on each polynomial coefficient are cumulated.

In an angular hue sector that does not include a slope discontinuity point of the chroma mapping function, small low frequency slope oscillations of the section specific chroma mapping function (e.g. the interpolating polynomial function) can occur. These slope oscillations might not be visible in any mapped picture, however they might alter the chroma of critical colors (e.g. skin tones, or any memory colors of familiar objects). In order to avoid such problem, some specific hues might be used as key hues as explained in the description of the invention below. This ensures a more precise control on the chroma mapping function applied on these colors.

SUMMARY OF INVENTION

An aim of the invention is to determine a chroma mapping function over the whole range of hue that avoids the above drawbacks such as aforementioned oscillations.

For this purpose, a subject of the invention is a method of determination of a chroma mapping function allowing to map at least the chroma of source colors of a content from a source color gamut into a target color gamut in a 3D gamut mapping color space allowing to define 2D constant-hue leaves having axes for lightness and chroma, comprising:

defining in said gamut mapping color space a plurality of key constant-hue leaves, each of them characterized by a specific key hue, such as to partition said gamut mapping color space into a plurality of angular hue sectors, each of them being delimited in hue direction by two different key constant-hue leaves, for each of said key constant hue leaves, defining a key hue leaf chroma mapping function allowing to map the chroma of any of said source colors belonging to this key constant-hue leaf, for each angular hue sector, defining a continuous angular hue sector chroma mapping function allowing to map the chroma of any of said source colors belonging to this angular hue sector, such that, for any source color belonging to one of the two key constant-hue leaves delimiting said angular hue sector, said continuous chroma mapping function allows to map the chroma of said source color according to the key hue leaf chroma mapping function of the key constant-hue leaf to which said source color belongs.

Preferably, said angular hue sector chroma mapping function is non linear for any of its variables and/or polynomial for any of its variables.

Among advantages of the method:

The chroma mapping function specific to each angular hue sector being equal to the key hue leaf chroma mapping functions on each key hue leaf delimiting this angular hue sector ensures a simple control on the chroma mapping function used for the key hues at a low complexity cost;

Although different angular hue sector chroma mapping functions are used for the different angular hue sectors, the color gamut mapping is continuous across the sectors;

Possibility to use the same polynomial, generic, parametric function to approximate chroma mapping functions having different behaviors, through the use of different parameters;

Using this continuous chroma mapping function mapping allows for discontinuities of second order (slope discontinuity) in chroma mapping (on the sections borders):

a Reduced complexity of the proposed chroma mapping function.

a Better modelling of higher order discontinuities.

Preferably, defining said key hue leaf chroma mapping function is performed such that, when applied to the chroma C of any source color of lightness L that belongs to the corresponding key constant hue leaf of hue h*, this chroma C is mapped into a chroma $$C' = C_{max}^{TARGET} \cdot g_h * \left( \frac{C}{C_{max}^{SOURCE}} \right),$$

where, in said key constant hue leaf:

$C_{max}^{SOURCE}$ is the chroma of a color at the intersection of a line of constant lightness L with said source color gamut, $C_{max}^{TARGET}$ is the chroma of a color at the intersection of said line of constant lightness L with said target color gamut.

Preferably, said relative key hue leaf chroma mapping function $g_{h*}(C/C_{max}^{SOURCE})$ is defined in said key constant hue leaf such as to be homogeneously growing in the interval [0, 1], non-linear, and independent from said lightness L.

Preferably, said relative key hue leaf chroma mapping function $g_{h*}(C/C_{max}^{SOURCE})$ is defined as a polynomial function. As this polynomial function is non linear, its degree is superior or equal to 2.

Preferably, defining said angular hue sector chroma mapping function is performed such that when applied to the chroma C of any source color of lightness L and hue h that belongs to said angular hue sector, this chroma C is mapped into a chroma $$C'' = C_{max}^{TARGET} \cdot g\left( h, \frac{C}{C_{max}^{SOURCE}} \right),$$

where, in the constant hue leaf to which this source color belongs:

$C_{max}^{SOURCE}$ is the chroma of a color at the intersection of a line of constant lightness L with said source color gamut, $C_{max}^{TARGET}$ is the chroma of a color at the intersection of said line of constant lightness L with said target color gamut.

Preferably, said angular hue sector chroma mapping function $$g\left( h, \frac{C}{C_{max}^{SOURCE}} \right)$$

is non linear both for the variable $C/C_{max}^{SOURCE}$ and the variable h.

Preferably, said angular hue sector chroma mapping function $$g\left(h, \frac{C}{C_{max}^{SOURCE}}\right)$$

is polynomial both for the variable $C/C_{max}^{SOURCE}$ and the variable h. As this polynomial function is non linear, its degree is superior or equal to 2. Preferably, the values taken by this polynomial functions of the variable hue at the border key hues are equal to the coefficients of the polynomial used as corresponding key chroma mapping function. Preferably, the degree of said polynomials with the relative chroma used as variable is greater or equal to the degree of the polynomials used as key chroma mapping functions.

In a first variant, the hue of at least one of said key constant-hue leaves correspond to the hue of one of the primary and secondary colors defining said source color gamut, or/and to the hue of one of the primary and secondary colors defining said target color gamut.

In a second variant, each of the hues of the primary and secondary colors defining said source color gamut and each of the hues of the primary and secondary colors defining said target color gamut corresponds to a hue of one of said key constant-hue leaves.

A subject of the invention is also a method of color gamut mapping source colors of a content into target colors from a source color gamut into a target color gamut comprising mapping each of said source colors having a hue h such that the chroma C of said source color is chroma-mapped into a chroma $$C'' = C_{max}^{TARGET} \cdot g\left(h, \frac{C}{C_{max}^{SOURCE}}\right),$$

where $C_{max}^{SOURCE}$ is the chroma of a color having the same lightness L and the same hue h as this source color and positioned on the boundary of the source color gamut, where $C_{max}^{TARGET}$ is the chroma of a color having the same hue h as this source color and positioned on the boundary of the target color gamut, wherein $$g\left(h, \frac{C}{C_{max}^{SOURCE}}\right)$$

is a chroma mapping function determined according to the above method for the angular hue sector to which this source color belongs.

Preferably, $C_{max}^{TARGET}$ is the chroma of a color having also the same lightness L as this source color.

A subject of the invention is also an image processing device for mapping source colors of a content into target colors from a source color gamut into a target color gamut comprising at least one processor configured for mapping each of said source colors according to the above method of color gamut mapping.

A subject of the invention is also an electronic device incorporating this image processing device. This electronic device is for instance a smartphone, a camera, a tablet, a TV set, a set-top-box, or a server.

A subject of the invention is also a computer program product comprising program code instructions to execute the steps of the above method of determination of a chroma mapping function, when this program is executed by at least one processor.

A subject of the invention is also a computer program product comprising program code instructions to execute the steps of the above mapping method, when this program is executed by at least one processor.

BRIEF DESCRIPTION OF DRAWINGS

The invention will be more clearly understood on reading the description which follows, given by way of non-limiting example and with reference to the appended figures in which.

DESCRIPTION OF EMBODIMENTS

The determination of a chroma mapping function according to the invention will now be described in the context of color gamut mapping source colors of a content into target colors from a source color gamut into a target color gamut in a 3D gamut mapping color space in reference to FIG. 5. Such a determination can be used in any other context.

Figure 5:
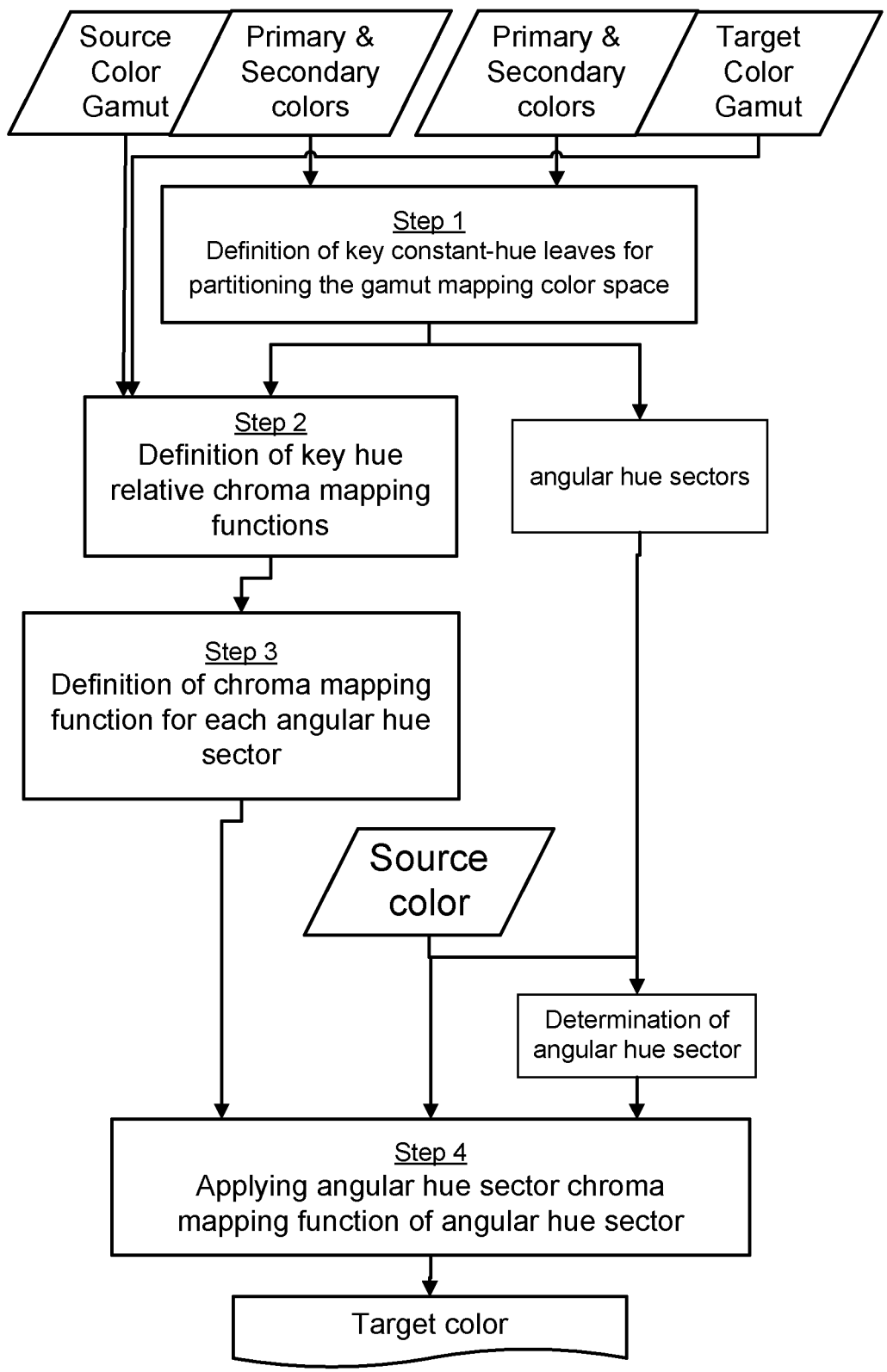
FIG. 5 is a diagram illustrating an embodiment of a color gamut mapping method according to the invention.

The functions of the various elements shown in the figures, notably FIG. 5, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage. Other hardware, conventional and/or custom, may also be included.

Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

As mapping color space, the CIE 1976 Lab color space, or IPT color space can be chosen. A Lab color space is a color-opponent space that is perceptually uniform, with dimension L for lightness and a and b for the color-opponent dimensions. The red/green opponent primary colors are represented along the a axis, with green at negative a values and red at positive a values. The yellow/blue opponent secondary/primary colors are represented along the b axis, with blue at negative b values and yellow at positive b values.

Any other color-opponent color space can be used as a mapping color space, for instance the IPT color space, where I can be used in place of L, and P and T in place of a and b.

Preferably, the mapping color space is chosen such that intersections of the source and/or target color gamut with constant hue leaves form straight lines passing through the black point or the white point. For instance, Instead of Lab or IPT color space, a simplified Lab color space, derived from the Lab color space, can be advantageously used. It is defined from CIE XYZ using the following formulas:

$$L_s = 100 \cdot \left(\frac{Y}{Y_n}\right)^{1/3}$$

$$a_s = 500 \cdot \left(\left(\frac{X}{X_n}\right)^{1/3} - \left(\frac{Y}{Y_n}\right)^{1/3}\right)$$

$$b_s = 200 \cdot \left(\left(\frac{Y}{Y_n}\right)^{1/3} - \left(\frac{Z}{Z_n}\right)^{1/3}\right)$$

($X_n$, $Y_n$ and $Z_n$ are the CIE XYZ values of the reference white point)

The advantage of this simplified Lab color space is that the borders of the gamut of standard emissive displays in each constant-hue leaf can be described by a straight line linking the origin with the cusp color of this constant-hue leaf. This advantage is also obtained for the IPT color space, and more generally it is obtained for any color space derived from CIE XYZ color space using positive homogenous functions, i.e. there is a real number k such that for any color $$\begin{pmatrix} X \\ Y \\ Z \end{pmatrix}$$

and for any α>0, $$f\begin{pmatrix} \alpha \cdot X \\ \alpha \cdot Y \\ \alpha \cdot Z \end{pmatrix} = \alpha^k \cdot f\begin{pmatrix} X \\ Y \\ Z \end{pmatrix}.$$

In this CIE 1976 Lab color space, colors can also be represented by polar coordinates, i.e. in an LCh mode, with L for the same lightness, the hue angle h according to $$h = \begin{cases} \operatorname{atan}(b/a) & a > 0 \wedge b > 0 \\ \pi/2 - \operatorname{atan}(a/b) & a \leq 0 \wedge b > 0 \\ 3\pi/2 - \operatorname{atan}(a/b) & a > 0 \wedge b \leq 0 \\ \pi + \operatorname{atan}(b/a) & a \leq 0 \wedge b \leq 0 \end{cases}$$

i.e., in a plane of constant lightness L, the angle between the vector having a, b as coordinates and the a-axis, $C=\sqrt{a^2+b^2}$ corresponding to the chroma. For a given lightness, the higher the C value the more saturated the color.

Other color spaces such as the appearance-based space JCh according to CIECAM-02 can be used for the mapping.

Furthermore, the below embodiment concerns a hue-preserving color gamut mapping. This means that the color mapping is not actually carried out in three dimensions in the color space but in two dimensions in a constant-hue leaf of the color space, i.e. in a 2D LC color space. The hue defining the constant-hue leaf in which the color mapping is to be performed is chosen to be the hue of the source color to be mapped.

The source color gamut in which source colors to map are all included can correspond to a specific or standard display device such as a LCD or an OLED panel, to the content to map, or to an image capture device such as a camera or a scanner, or to any other actual or virtual color device. This source color gamut is notably defined by a black point, a white point and three source primary colors. Three source secondary colors are defined such that each source secondary color is composed by two different source primary colors.

The target color gamut in which source colors are to be mapped can correspond for instance to a specific or standard display device or to a printer. This target color gamut is notably defined by a black point, a white point and three target primary colors. The black point and the white point are the same as those of the source color gamut. At least one target primary color is different from the source primary colors. Three target secondary colors are defined such that each target secondary color is composed by two different target primary colors.

Figure 1:
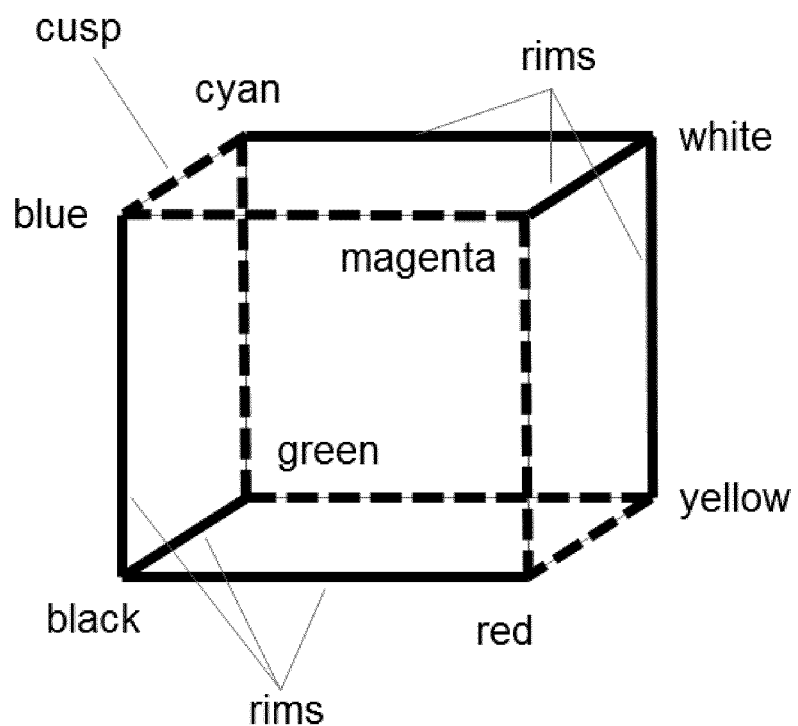
FIG. 1 illustrates the cusp line and the rims of a color gamut in a RGB color space.
Figure 2:
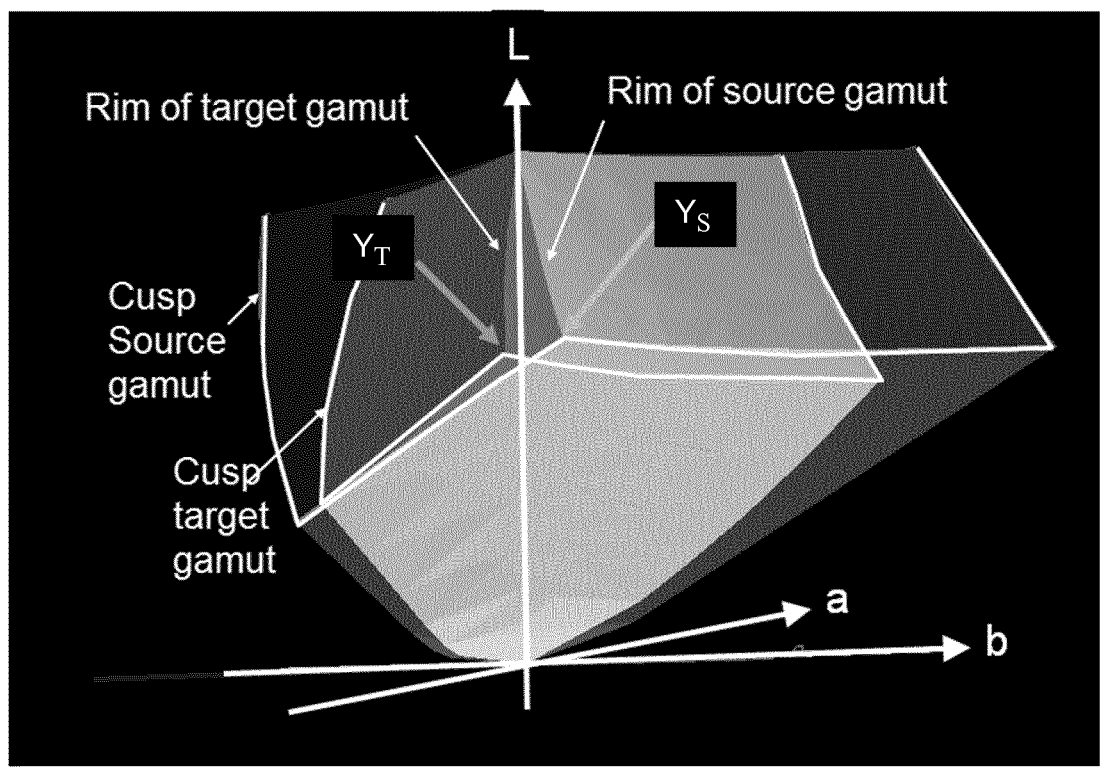
FIG. 2 illustrates a source color gamut and a target color gamut in the Lab color space.
Figure 3:
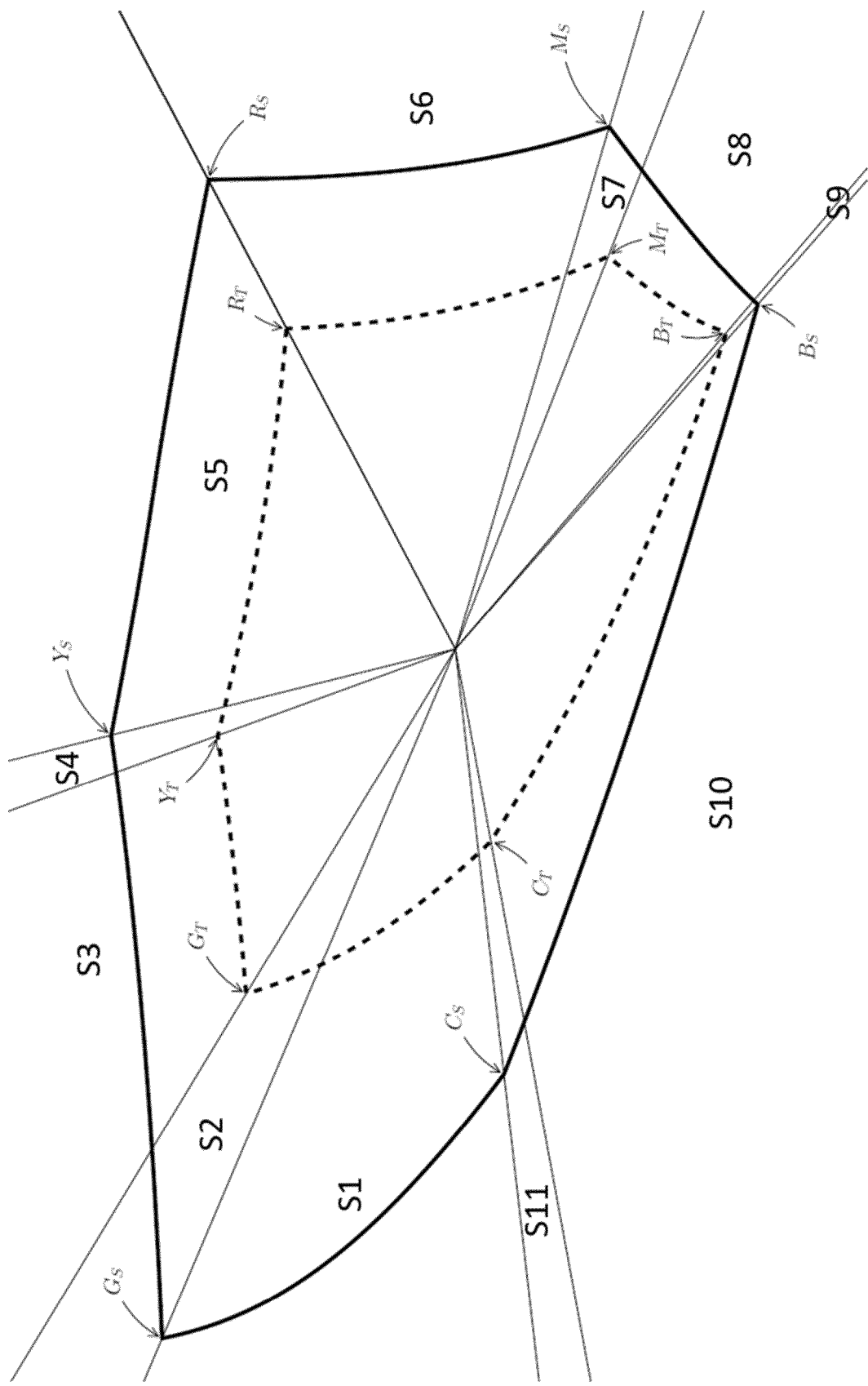
FIG. 3 shows in a hue/chroma plane an example of key hues and the corresponding partitioning into hue angular sectors.

Furthermore, as illustrated on FIG. 3, the primary colors, the secondary colors, the black point and the white point of the source and target color gamuts are supposed to be known.

Assuming that each color to map is represented in the mapping color space Lch by the following coordinates:

$$N = \begin{pmatrix} L \\ C \\ h \end{pmatrix},$$

we will define a chroma mapping function and apply it as described in the following steps.

1st Step: Definition of Key Constant-Hue Leaves Partitioning the Gamut Mapping Color Space into a Plurality of Angular Hue Sectors:

In the specific situation depicted on FIG. 3, each of the hues of the source primary and secondary colors and each of the hues of the target primary and secondary colors defines a key hue. On FIG. 3, solid lines joining the center corresponding to the black and the white point to any of the projection of the primary and secondary colors of the source and target color gamuts correspond to these key hues.

In the specific situation depicted on FIG. 3, the hue of the source Red primary Rs and that of the target Red primary $R_T$ are so close that these red primaries define only one key hue and therefore the same key constant hue leaf.

In other specific situations (not illustrated), key hues could be any hue corresponding to a point of interest of the color gamut mapping method, for example a hue corresponding to a slope discontinuity point of the chroma mapping function.

In other specific situations (not illustrated), key hue(s) can be added, for instance as specific hues that have to be specifically considered for the color mapping, as for instance a hue specific to skin tones. Each key hue defines a key constant-hue leaf.

Figure 4:
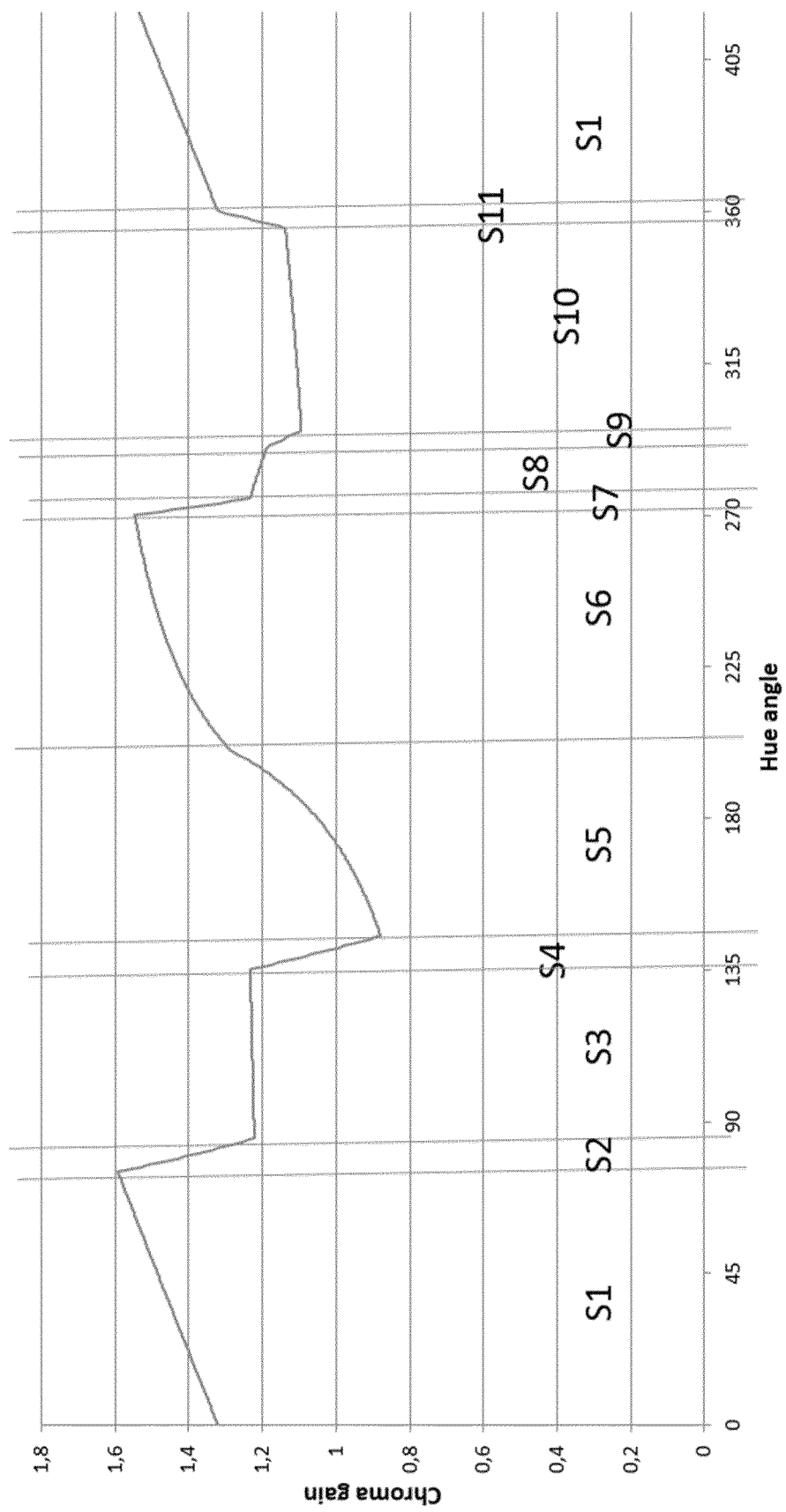
FIG. 4 shows an exemplary plot diagram of chroma mapping gain together with a partition of the hue range of the mapping color space into 11 angular hue sectors.

As shown on FIGS. 3 and 4, the plurality of key constant-hue leaves defined by the different key hues partitions the mapping color space into a plurality of angular hue sectors S1 to S11. Each angular hue sector is delimited in hue direction by two different key constant-hue leaves.

2$^{nd}$ Step: Definition of a Key Hue Leaf Relative Chroma Mapping Function in Each Key Constant Hue Leaf:

A key hue leaf relative chroma mapping function g( ) is defined for each key leaf of constant hue h*. This relative chroma mapping function g( ) aims at mapping a source color having a lightness L and a chroma C into a chroma mapped color having a chroma C' such that:

$$C' = C_{max}^{TARGET} \cdot g_{h*}\left(\frac{C}{C_{max}^{SOURCE}}\right)$$

$C_{max}^{SOURCE}$ is defined in this key constant-hue leaf as the chroma of a color having the same lightness L as the source color and positioned on the boundary of the source color gamut.

$C_{max}^{TARGET}$ is defined in this key constant-hue leaf as the chroma of a color having the same lightness L as the source color and positioned on the boundary of the target color gamut.

In this non-limiting embodiment, this relative chroma mapping function g( ) is defined for each key constant-hue leaf such as to be continuous and monotonically increasing from the interval [0, 1] to the interval [0, 1], non-linear, and independent from the lightness L.

Such a definition of the relative chroma mapping functions $g_{h*}($ ) of the different key constant hue leaves ensures that the chroma mapped colors are within the target color gamut since $g_{h*}($ ) is a function mapping the (relative) interval [0, 1] to a (relative) interval included in [0, 1], which means that a chroma C of any source color in the interval [0, $C_{max}^{SOURCE}$] will always be mapped to a chroma C' in the interval [0, $C_{max}^{TARGET}$].

Preferably, this relative chroma mapping function g( ) is polynomial.

Preferably, the order of this polynomial relative chroma mapping function g( ) is higher than or equal to 2.

As an example of definition of such a polynomial relative chroma mapping function, we have:

$$g_{h*}:[0, 1] \to [0, 1]$$

$$x \to (1-\alpha) \cdot x^2 + \alpha \cdot x$$

i.e.: $g_{h*}\left(\frac{C}{C_{max}^{SOURCE}}\right) = (1-\alpha) \cdot \left(\frac{C}{C_{max}^{SOURCE}}\right)^2 + \alpha \cdot \left(\frac{C}{C_{max}^{SOURCE}}\right)$ where $\alpha$ is defined as an average, in the constant hue leaf, of the ratio $$\frac{C_{max}^{SOURCE}}{C_{max}^{TARGET}}$$

over all colors sampling the surface of the constant hue leaf included in the source color gamut.

For sampling the portion of the constant hue leaf (hue=h): knowing the lightness of the white point ($L_{max}$), one can define two integers m and n, a chroma step ($\delta_C = C_{Cusp}^{SOURCE}/m$) and a lightness step ($\delta_L = L_{max}/n$), and use as sample every color $$\begin{pmatrix} L = j \cdot \delta_L \\ C = k \cdot \delta_C \\ h \end{pmatrix}$$

included in said source color gamut with j in [0,m] and k in [0,n].

An advantage of having $\alpha$ equal to an average of the ratio $$\frac{C_{max}^{SOURCE}}{C_{max}^{TARGET}}$$

is that, in average, for the low values of relative chroma, the chroma mapped chroma C' will be close to the chroma C of the source color to map.

In a general situation, for each key hue h*, the key chroma mapping function can then be defined as a polynomial function as follows:

$$g_{h*}(x) = \Sigma_{k \leq n} u_{h*,k} \cdot x^k,$$

where x is the relative chroma $$\frac{C}{C_{max}^{SOURCE}}$$

of the source color to map.

In a more specific situation, for each key hue h*, the key chroma mapping function can be defined as follows:

$$g_{h*}(x) = u_{h*,6} \cdot x^6 + u_{h*,5} \cdot x^5 + u_{h*,4} \cdot x^4 + u_{h*,3} \cdot x^3 + u_{h*,2} \cdot x^2 + u_{h*,1} \cdot x$$

Such a polynomial of degree 6 can be used to approximate the following piecewise non-linear function:

$$g_{h*}(x) = \begin{cases} \alpha \cdot x & \text{if } x \leq 1/2 \\ 2 \cdot (1-\alpha) \cdot x^2 + (2 \cdot \alpha - 1) \cdot x & \text{if } x > 1/2 \end{cases}$$

Such a mapping function is linear in the interval [0, ½] but non linear in the interval [½, 1].

For α=1.3, this mapping function can be approximated by the following polynomial function:

$$g_{h*}(x) = 5.984 \cdot x^6 + 18.82 \cdot x^5 - 21.53 \cdot x^4 + 10.28 \cdot x^3 - 2.011 \cdot x^2 + 1.425 \cdot x$$

3$^{rd}$ Step: Definition of an Angular Hue Sector Chroma Mapping for Each Angular Hue Sector:

When the key hue leaf chroma mapping function is defined according to the general situation above, for an angular hue sector bounded by key hues $h^*_0$ and $h^*_1$, the following polynomial function can be used as angular hue sector chroma mapping function for all source colors inside this sector:

$$g(h, x) = \sum_{k \leq n} \left( (h - h_0^*) \cdot \left( \frac{u_{1,k} - u_{0,k}}{h_1^* - h_0^*} + (h - h_1^*) \cdot \sum_{j \leq p} v_{j,k} \cdot h^j \right) + u_{0,k} \right) \cdot x^k$$

(to simplify the equation: $u_{0,k} = u_{h^*_0, k}$ and $u_{1,k} = u_{h^*_1, k}$)

The values taken by this polynomial function at the key hues $h^*_0$ and $h^*_1$ of the key constant-hue leaves delimiting the angular hue sector are equal to the coefficients of the polynomial used as corresponding key chroma mapping function, such that:

$$g(h^*_0, x) = \Sigma_{k \leq n} u_{h^*_0, k} \cdot x^k = g_{h^*_0}(x)$$

as defined in 2$^{nd}$ step above, and $$g(h^*_1, x) = \Sigma_{k \leq n} u_{h^*_1, k} \cdot x^k = g_{h^*_1}(x)$$

as defined in 2$^{nd}$ step above.

Here, such an angular hue sector chroma mapping function is a polynomial function, with the relative chroma $$\frac{C}{C_{max}^{SOURCE}}$$

used as variable and with polynomials of the variable hue h as coefficients. Values taken by said polynomial functions of the variable hue at the border key hues are equal to the coefficients of the polynomial used as corresponding key chroma mapping function defined in 2$^{nd}$ step above.

Here, such an angular hue sector chroma mapping function is a polynomial function which is non linear both for the relative chroma variable $x = C/C_{max}^{SOURCE}$ and the hue variable h.

In this example, the degree (n) of said polynomial with the relative chroma (x) used as variable is equal to the degree (n) of the polynomials used as key chroma mapping functions. Preferably, the degree of said polynomials with the relative chroma used as variable is greater or equal to the degree of the polynomials used as key chroma mapping functions.

When the key hue leaf chroma mapping function is defined according to the more specific situation above, for an angular sector bounded by key hues $h^*_0$ and $h^*_1$, the following polynomial functions family can be used to generate the section specific chroma mapping functions:

$$g(h, x) = \sum_{k \leq 6} \left( (h - h_0^*) \cdot \left( \frac{u_{1,k} - u_{0,k}}{h_1^* - h_0^*} + (h - h_1^*) \cdot \sum_{j \leq 6} v_{j,k} \cdot h^j \right) + u_{0,k} \right) \cdot x^k$$

In this specific situation, the degree of said polynomials with hue (h) used as variable is also equal to the degree of the polynomials with the relative chroma (x) used as variable. Other variants can be envisaged.

The coefficients $v_{j,k}$ can be determined using a known approximation method, typically a curve fitting method like a polynomial regression.

A polynomial regression method consists in finding a polynomial of degree n which best fits a given function or a set of m≥n given points.

Polynomial interpolation can be seen as a special case of polynomial regression. This consists in finding the polynomial of degree n that goes exactly through m=n given points. However polynomial regression with m>n given points is preferred since we can achieve a better fit of the underlying function (minimizing the error between the given function, or the given points and the polynomial that approximates said given function or said given points).

Any other known approximation methods (e.g. constrained minimization) can be used instead, for example for explicitly minimizing oscillations of the polynomial.

A set of given source colors can be for instance sampled in each hue angular sector as follows. For each hue angular sector, at least n relative chroma values are defined in [0, 1] and at least p hue values are defined in ]$h^*_0$, $h^*_1$[(exactly n and exactly p, respectively, in case of polynomial interpolation). Alternatively, for each hue angular sector, one can define at least n·p pairs of relative chroma value and hue in [0, 1]×]$h^*_0$, $h^*_1$[. Preferably, for each hue angular sector, one defines at least $n^2/2$ relative chroma values and at least $p^2/2$ hue values (or alternatively $$\frac{(n \cdot p)^2}{4}$$

pairs in [0, 1]×]$h^*_0$, $h^*_1$[). A constant lightness value or different lightness values is associated to these pairs of hue and chroma, thus providing a set of given source colors. Then, target colors corresponding to these given source colors are determined. This determination of the target colors can be made using a given chroma mapping function to be approximated, or can be guided by artistic intent, by devices constraints, by given Look Up Tables, by given known color transforms, or a combination of those or by any other constraints. Finally a set of pairs is obtained, wherein each pair is formed by a given source color and its corresponding target color. Each pair can be represented by a point. The obtained points are used as input data of the approximation or regression method.

4$^{th}$ Step: Chroma Mapping Using the Chroma Mapping Function as Defined for Each Angular Hue Sector:

Assuming that each color to map is represented in the mapping color space Lch by the following coordinates:

$$N = \begin{pmatrix} L \\ C \\ h \end{pmatrix},$$

the angular hue sector to which this source color belongs is determined such that $h^*_q \leq h < h^*_{(q+1)}$.

The relative chroma mapping function $$g\left(h, \frac{C}{C_{max}^{SOURCE}}\right)$$

as defined above for this angular hue sector is then applied to the ratio of the chroma C of the source color to map by the chroma $C_{max}^{SOURCE}$, resulting, when multiplied by the chroma $C_{max}^{TARGET}$, into a mapped chroma $$C'' = C_{max}^{TARGET} \cdot g\left(h, \frac{C}{C_{max}^{SOURCE}}\right).$$

The final color that is obtained is a target color N' having the following coordinates $$N' = \begin{pmatrix} L' = L \\ C'' = C_{max}^{TARGET} \cdot g\left(h, \frac{C}{C_{max}^{SOURCE}}\right) \\ h \end{pmatrix}.$$

Alternatively, this step includes also a lightness mapping, using for instance a lightness mapping function f(L,C, h). Applying this lightness mapping function f( ) will then give a final color having the following coordinates $$N' = \begin{pmatrix} L' = f(L, C, h) \\ C'' = C_{max}^{TARGET} \cdot g\left(h, \frac{C}{C_{max}^{SOURCE}}\right) \\ h \end{pmatrix}.$$

Advantageously, this lightness mapping function f(L,C,h) is defined such that the lightness $L_{Cusp}^{SOURCE}$ of a source cusp color having the same hue h as the source color is lightness mapped into the lightness $L_{Cusp}^{TARGET}$ of a target cusp color having the same hue h as the source color. This condition corresponds to what is generally named "cusp mapping".

As a conclusion of the mapping, the implementation of the above first to fourth steps leads to a global color gamut mapping of source colors of a content map from the source color gamut in which they are located into target colors in the target color gamut.

According to a hardware aspect, the invention relates to an image processing device for mapping source colors of a content which are provided in a source color gamut into targets colors of a target color gamut.

This image processing device comprises at least one processor configured to implement the above mapping method.

The different steps of this mapping method which are processed by the at least one processor of the image processing device may or may not correspond to physically distinguishable units in the device.

This image processing device is implemented according to a purely hardware embodiment, for example in the form of a dedicated component (for example in an ASIC (application specific integrated circuit) or FPGA (field-programmable gate array) or VLSI (very large scale integration) or of several electronic components integrated into a device or even in the form of a mixture of hardware elements and software elements.

When source colors are provided in a color space different from the mapping color space as defined above, these source colors are transformed in a manner known per se into a representation in this mapping color space before being mapped.

While the present invention is described with respect to a particular embodiment, it is understood that the present invention is not limited to this embodiment. The present invention as claimed therefore includes variations from this embodiment described herein, as will be apparent to one of skill in the art.

It is to be further understood that, because some of the constituent system components and methods depicted in the accompanying drawings are preferably implemented in software, the actual connections between the system components or the process function blocks may differ depending upon the manner in which the invention is implemented.

The invention claimed is:

1. A method of determination of a chroma mapping function allowing to map at least the chroma C of source colors of a content from a source color gamut into a target color gamut in a 3D gamut mapping color space allowing to define 2D constant-hue leaves having axes for lightness and chroma, comprising:

defining in said gamut mapping color space a plurality of key constant-hue leaves, wherein a key constant-hue leaf is defined by a specific key hue corresponding to the hue of one of the primary and secondary colors defining said source color gamut, or/and to the hue of one of the primary and secondary colors defining said target color gamut, such as to partition said gamut mapping color space into a plurality of angular hue sectors, wherein an angular hue sector is delimited in hue direction by two different key constant-hue leaves, for said key constant-hue leaf of hue h*, defining a key hue leaf chroma mapping function $g_{h*}$ allowing to map the chroma of any of said source colors belonging to said key constant-hue leaf, such that, when applied to the chroma C of a source color of lightness L that belongs to the corresponding key constant: hue leaf of hue h*, said chroma C is mapped into a chroma $$C' = C_{max-h^*}^{TARGET} \cdot g_{h^*}\left(\frac{C}{C_{max-h^*}^{SOURCE}}\right),$$

where, in said key constant-hue leaf of hue h*:
$c_{max-h^*}^{SOURCE}$ is the chroma of a color at the intersection of a line of constant lightness L with said source color gamut,
$C_{max-h^*}^{TARGET}$ is the chroma of a color at the intersection of said line of constant lightness L with said target color gamut, for an angular hue sector, defining a continuous angular hue sector chroma mapping function g allowing to map the chroma of any of said source colors belonging to this angular hue sector, such that, when applied to the chroma C of a source color of lightness L and hue h that belongs to said angular hue sector, said chroma C is mapped into a chroma $$C'' = C_{max-h}^{TARGET} \cdot g\left(h, \frac{C}{C_{max-h}^{SOURCE}}\right),$$

where, in the constant hue leaf of hue h:
$C_{max-h}^{SOURCE}$ is the chroma of a color at the intersection of a line of constant lightness L with said source color gamut, $C_{max-h}^{TARGET}$ is the chroma of a color at the intersection of said line of constant lightness L with said target color gamut, and wherein said continuous angular hue sector chroma mapping function g is such that, for a source color belonging to one of the two key constant-hue leaves of hue h* delimiting said angular hue sector, said continuous chroma mapping function allows to map the chroma of said source color according to the key hue leaf chroma mapping function $g_{h*}$ of the key constant-hue leaf to which said source color belongs.

2. The method of determination of a chroma mapping function according to claim 1, wherein said key hue leaf chroma mapping function $g_{h*}$ is defined in said key constant hue leaf such as to be homogeneously growing in the interval [0, 1], non-linear, and independent from said lightness L.

3. The method of determination of a chroma mapping function according to claim 2, wherein said key hue leaf chroma mapping function $g_{h*}$ is polynomial.

4. The method of determination of a chroma mapping function according to claim 1, wherein said angular hue sector chroma mapping function g is non linear for any of its variables comprising the hue h and the ratio $C/C_{max-h}^{SOURCE}$ of chroma C of a source color to the chroma $C_{max-h}^{SOURCE}$ of a color at the intersection of a line of constant lightness L with said source color gamut.

5. The method of determination of a chroma mapping function according to claim 4, wherein said angular hue sector chroma mapping function g is polynomial both for the variable $C/C_{max-h}^{SOURCE}$ and the variable h.

6. A method of color gamut mapping at least the chroma C of source colors of a content into target colors from a source color gamut into a target color gamut in a 3D gamut mapping color space allowing to define 2D constant-hue leaves having axes for lightness and chroma, comprising:
mapping the chroma of said source colors according to a determined chroma mapping function,
wherein the chroma mapping function is determined by and in accordance with:
defining in said gamut mapping color space a plurality of key constant-hue leaves, wherein a key constant-hue leaf is defined by a specific key hue corresponding to the hue of one of the primary and secondary colors defining said source color gamut, or/and to the hue of one of the primary and secondary colors defining said target color gamut, such as to partition said gamut mapping color space into a plurality of angular hue sectors, wherein an angular hue sector is delimited in hue direction by two different key constant-hue leaves;
for said key constant-hue leaf of hue h*, defining a key hue leaf chroma mapping function $g_{h*}$ allowing to map the chroma of any of said source colors belonging to said key constant-hue leaf, such that, when applied to the chroma C of a source color of lightness L that belongs to the corresponding key constant-hue leaf of hue h*, said chroma C is mapped into a chroma $$C' = C_{max-h*}^{TARGET} \cdot g_{h*}\left(\frac{C}{C_{max-h*}^{SOURCE}}\right),$$

where, in said key constant hue leaf of hue h*:
$C/C_{max-h*}^{SOURCE}$ is the chroma of a color at the intersection of a line of constant lightness L with said source color gamut;
$C/C_{max-h*}^{TARGET}$ is the chroma of a color at the intersection of said line of constant lightness L with said target color gamut;
for an angular hue sector, defining a continuous angular hue sector chroma mapping function n allowing to map the chroma of any of said source colors belonging to this angular hue sector, such that, when applied to the chroma C of a source color of lightness L and hue h that belongs to said angular hue sector, said chroma C is mapped into a chroma $$C'' = C_{max-h}^{TARGET} \cdot g\left(h, \frac{C}{C_{max-h}^{SOURCE}}\right),$$

where, in the constant hue leaf of hue h:
$C/C_{max-h*}^{SOURCE}$ is the chroma of a color at the intersection of a line of constant lightness L with said source color gamut;
$C/C_{max-h*}^{TARGET}$ is the chroma of a color at the intersection of said line of constant lightness L with said target color gamut; and
wherein said continuous angular hue sector chroma mapping function g is such that, for a source color belonging to one of the two key constant-hue leaves of hue h* delimiting said angular hue sector, said continuous chroma mapping function allows to map the chroma of said source color according to the key hue leaf chroma mapping function $g_{h*}$ of the key constant-hue leaf to which said source color belongs.

7. The method of claim 6 wherein said key hue leaf chroma mapping function gh* is defined in said key constant hue leaf such as to be homogeneously growing in the interval [0,1], non-linear, and independent from said lightness L.

8. The method of claim 6 wherein said key hue leaf chroma mapping function gh* is polynomial.

9. The method of claim 6 wherein said angular hue sector chroma mapping function g is non linear for any of its variables comprising the hue h and the ratio $C/C_{max-h}^{SOURCE}$ of chroma C of a source color to the chroma $C_{max-h}^{SOURCE}$ of a color at the intersection of a line of constant lightness L with said source color gamut.

10. The method of claim 6 wherein said angular hue sector chroma mapping function g is polynomial both for the variable $C/C_{max-h}^{SOURCE}$ and the variable h.

11. An image processing device for mapping source colors of a content into target colors from a source color gamut into a target color gamut in a 3D gamut mapping color space allowing to define 2D constant-hue leaves having axes for lightness and chroma, comprising
at least one processor; and
a non-transitory memory, the non-transitory memory storing instructions that, when executed by the at least one processor, cause the image processing device to:
map the chroma of said source colors according to a determined chroma mapping function,
wherein the determined chroma mapping function is determined by and in accordance with:
defining in said gamut mapping color space a plurality of key constant-hue leaves, wherein a key constant-hue leaf is defined by a specific key hue corresponding to the hue of one of the primary and secondary colors defining said source color gamut, or/and to the hue of one of the primary and secondary colors defining said target color gamut, such as to partition said gamut mapping color space into a plurality of angular hue sectors, wherein an angular hue sector is delimited in hue direction by two different key constant-hue leaves;

for said key constant-hue leaf of hue h*, defining a key hue leaf chroma mapping function $g_{h*}$ allowing to map the chroma of any of said source colors belonging to said key constant-hue leaf, such that, when applied to the chroma C of a source color of lightness L that belongs to the corresponding key constant-hue leaf of hue h*, said chroma C is mapped into a chroma $$C' = C_{max-h^*}^{TARGET} \cdot g_{h^*}\left(\frac{C}{C_{max-h^*}^{SOURCE}}\right),$$

where, in said key constant hue leaf of hue h*:
- $C/C_{max-h^*}^{SOURCE}$ is the chroma of a color at the intersection of a line of constant lightness L with said source color gamut;
- $C/C_{max-h^*}^{TARGET}$ the chroma of a color at the intersection of said line of constant lightness L with said target color gamut;

for an angular hue sector, defining a continuous angular hue sector chroma mapping function g allowing to map the chroma of any of said source colors belonging to this angular hue sector, such that, when applied to the chroma C of a source color of lightness L and hue h that belongs to said angular hue sector, said chroma C is mapped into a chroma $$C'' = C_{max-h}^{TARGET} \cdot g\left(h, \frac{C}{C_{max-h}^{SOURCE}}\right),$$

where, in the constant hue leaf of hue h*:
- $C/C_{max-h}^{SOURCE}$ is the chroma of a color at the intersection of a line of constant lightness L with said source color gamut;
- $C/C_{max-h}^{TARGET}$ is the chroma of a color at the intersection of said line of constant lightness L with said target color gamut; and wherein said continuous angular hue sector chroma mapping function g is such that, for a source color belonging to one of the two key constant-hue leaves of hue h* delimiting said angular hue sector, said continuous chroma mapping function allows to map the chroma of said source color according to the key hue leaf chroma mapping function gh* of the key constant-hue leaf to which said source color belongs.

12. The image processing device of claim 11 wherein said key hue leaf chroma mapping function gh* is polynomial.

13. The image processing device of claim 11 wherein said angular hue sector chroma mapping function g is polynomial both for the variable $C/C_{max-h}^{SOURCE}$ and the variable h.

14. A device comprising at least one processor configured to:

determine a chroma mapping function allowing to map at least the chroma C of source colors of a content from a source color gamut into a target color gamut in a 3D gamut mapping color space allowing to define 2D constant-hue leaves having axes for lightness and chroma, wherein determining the chroma mapping function comprises:

defining in said gamut mapping color space a plurality of key constant-hue leaves, wherein a key constant-hue leaf is defined by a specific key hue corresponding to the hue of one of the primary and secondary colors defining said source color gamut, or/and to the hue of one of the primary and secondary colors defining said target color gamut, such as to partition said gamut mapping color space into a plurality of angular hue sectors, wherein an angular hue sector is delimited in hue direction by two different key constant-hue leaves;

for said key constant-hue leaf of hue h*, defining a key hue leaf chroma mapping function $g_{h*}$ allowing to map the chroma of any of said source colors belonging to said key constant-hue leaf, such that, when applied to the chroma C of a source color of lightness L that belongs to the corresponding key constant-hue leaf of hue h*, said chroma C is mapped into a chroma $$C' = C_{max-h^*}^{TARGET} \cdot g_{h^*}\left(\frac{C}{C_{max-h^*}^{SOURCE}}\right),$$

where, in said key constant hue leaf of hue h*:
- $C/C_{max-h^*}^{SOURCE}$ intersection of a line of constant lightness L with said source color gamut;
- $C/C_{max-h^*}^{TARGET}$ is the chroma of a color at the intersection of said line of constant lightness L with said target color gamut;

for an angular hue sector, defining a continuous angular hue sector chroma mapping function g allowing to map the chroma of any of said source colors belonging to this angular hue sector, such that, when applied to the chroma C of a source color of lightness L and hue h that belongs to said angular hue sector, said chroma C is mapped into a chroma $$C'' = C_{max-h}^{TARGET} \cdot g\left(h, \frac{C}{C_{max-h}^{SOURCE}}\right),$$

where, in the constant hue leaf of hue h:
- $C/C_{max-h}^{SOURCE}$ intersection of a line of constant lightness L with said source color gamut;
- $C/C_{max-h}^{TARGET}$ is the chroma of a color at the intersection of said line of constant lightness L with said target color gamut; and wherein said continuous angular hue sector chroma mapping function g is such that, for a source color belonging to one of the two key constant-hue leaves of hue h* delimiting said angular hue sector, said continuous chroma mapping function allows to map the chroma of said source color according to the key hue leaf chroma mapping function $g_{h*}$ of the key constant-hue leaf to which said source color belongs.

15. The device of claim 14 wherein said key hue leaf chroma mapping function gh* is polynomial.

16. The device of claim 14 wherein said angular hue sector chroma mapping function g is polynomial both for the variable $C/C_{max-h}^{SOURCE}$ and the variable h.

17. A non-transitory computer readable storage medium having stored thereon program code instructions that, when executed by at least one processor, cause the at least one processor to:

determine a chroma mapping function allowing to map at least the chroma C of source colors of a content from a source color gamut into a target color gamut in a 3D gamut mapping color space allowing to define 2D constant-hue leaves having axes for lightness and chroma, wherein determining the chroma mapping function comprises:

defining in said gamut mapping color space a plurality of key constant-hue leaves, wherein a key constant-hue leaf is defined by a specific key hue corresponding to the hue of one of the primary and secondary colors defining said source color gamut, or/and to the hue of one of the primary and secondary colors defining said target color gamut, such as to partition said gamut mapping color space into a plurality of angular hue sectors, wherein an angular hue sector is delimited in hue direction by two different key constant-hue leaves;

for said key constant-hue leaf of hue h*, defining a key hue leaf chroma mapping function $g_{h^*}$ allowing to map the chroma of any of said source colors belonging to said key constant-hue leaf, such that, when applied to the chroma C of a source color of lightness L that belongs to the corresponding key constant-hue leaf of hue h*, said chroma C is mapped into a chroma $$C' = C_{max-h^*}^{TARGET} \cdot g_{h^*}\left(\frac{C}{C_{max-h^*}^{SOURCE}}\right),$$

where, in said key constant hue leaf of hue h*:

$C/C_{max-h^*}^{SOURCE}$ is the chroma of a color at the intersection of a line of constant lightness L with said source color gamut;

$C/C_{max-h^*}^{TARGET}$ is the chroma of a color at the intersection of said line of constant lightness L with said target color gamut;

for an angular hue sector, defining a continuous angular hue sector chroma mapping function g allowing to map the chroma of any of said source colors belonging to this angular hue sector, such that, when applied to the chroma C of a source color of lightness L and hue h that belongs to said angular hue sector, said chroma C is mapped into a chroma $$C'' = C_{max-h}^{TARGET} \cdot g\left(h, \frac{C}{C_{max-h}^{SOURCE}}\right),$$

where, in the constant hue leaf of hue h:

$C/C_{max-h}^{SOURCE}$ is the chroma of a color at the intersection of a line of constant lightness L with said source color gamut;

$C/C_{max-h}^{TARGET}$ intersection of said line of constant lightness L with said target color gamut; and wherein said continuous angular hue sector chroma mapping function g is such that, for a source color belonging to one of the two key constant-hue leaves of hue h* delimiting said angular hue sector, said continuous chroma mapping function allows to map the chroma of said source color according to the key hue leaf chroma mapping function $g_{h^*}$ of the key constant-hue leaf to which said source color belongs.

* * * * *